Sept. 9, 1958  G. C. ANDREOPOULOS ET AL  2,851,256
CLOSED CONTINUOUS MIXER

Filed Jan. 13, 1955   5 Sheets-Sheet 1

INVENTOR
GEORGE C. ANDREOPOULOS
JOHN A. ABBOTT JR.
BY Bradley Cohn
ATTORNEY

Sept. 9, 1958 G. C. ANDREOPOULOS ET AL 2,851,256
CLOSED CONTINUOUS MIXER
Filed Jan. 13, 1955 5 Sheets-Sheet 2

INVENTOR
GEORGE C. ANDREOPOULOS
JOHN A. ABBOTT JR.
BY Bradley Cohn
ATTORNEY

Sept. 9, 1958 G. C. ANDREOPOULOS ET AL 2,851,256
CLOSED CONTINUOUS MIXER
Filed Jan. 13, 1955 5 Sheets-Sheet 3

INVENTOR
GEORGE C. ANDREOPOULOS
JOHN A. ABBOTT JR.
BY
ATTORNEY

Sept. 9, 1958    G. C. ANDREOPOULOS ET AL    2,851,256
CLOSED CONTINUOUS MIXER
Filed Jan. 13, 1955    5 Sheets-Sheet 4

INVENTOR
GEORGE C. ANDREOPOULOS
JOHN A. ABBOTT JR.
BY *Bradley Cohn*
ATTORNEY

Sept. 9, 1958    G. C. ANDREOPOULOS ET AL    2,851,256
CLOSED CONTINUOUS MIXER

Filed Jan. 13, 1955    5 Sheets-Sheet 5

INVENTOR
GEORGE C. ANDREOPOULOS
JOHN A. ABBOTT JR.
BY
ATTORNEY

United States Patent Office 2,851,256
Patented Sept. 9, 1958

2,851,256
CLOSED CONTINUOUS MIXER

George C. Andreopoulos, Tonawanda, N. Y., and John A. Abbott, Jr., South San Francisco, Calif., assignors to American Machine & Foundry Company, a corporation of New Jersey Application January 13, 1955, Serial No. 481,505

15 Claims. (Cl. 259—9)

This invention relates to mixing machines, and more particularly those of the closed type in which liquids and gases are continuously mixed on a low volume high throughput basis.

It is an object of this invention to provide in a continuous mixer high turbo shearing action in a small area.

It is a further object of the invention to devise such a mixer that will permit complete exposure of all stator and rotor teeth without removal of any parts.

It is a further object of the invention to provide a mixer of this type designed to incorporate more secondary ingredients when required.

Another object of the invention is to design a mixer of this type having all of its mixing action at the extreme periphery to provide maximum velocity on the whipping elements at all times.

It is a further object of the invention to provide a rotor and stator tooth design that will permit straight-through brushing and cleaning and at the same time prevent straight-through flow of materials when in operation.

It is a further object of the invention to provide a mixer of improved quality of mixing that will provide more ready accessibility.

Figure 1:
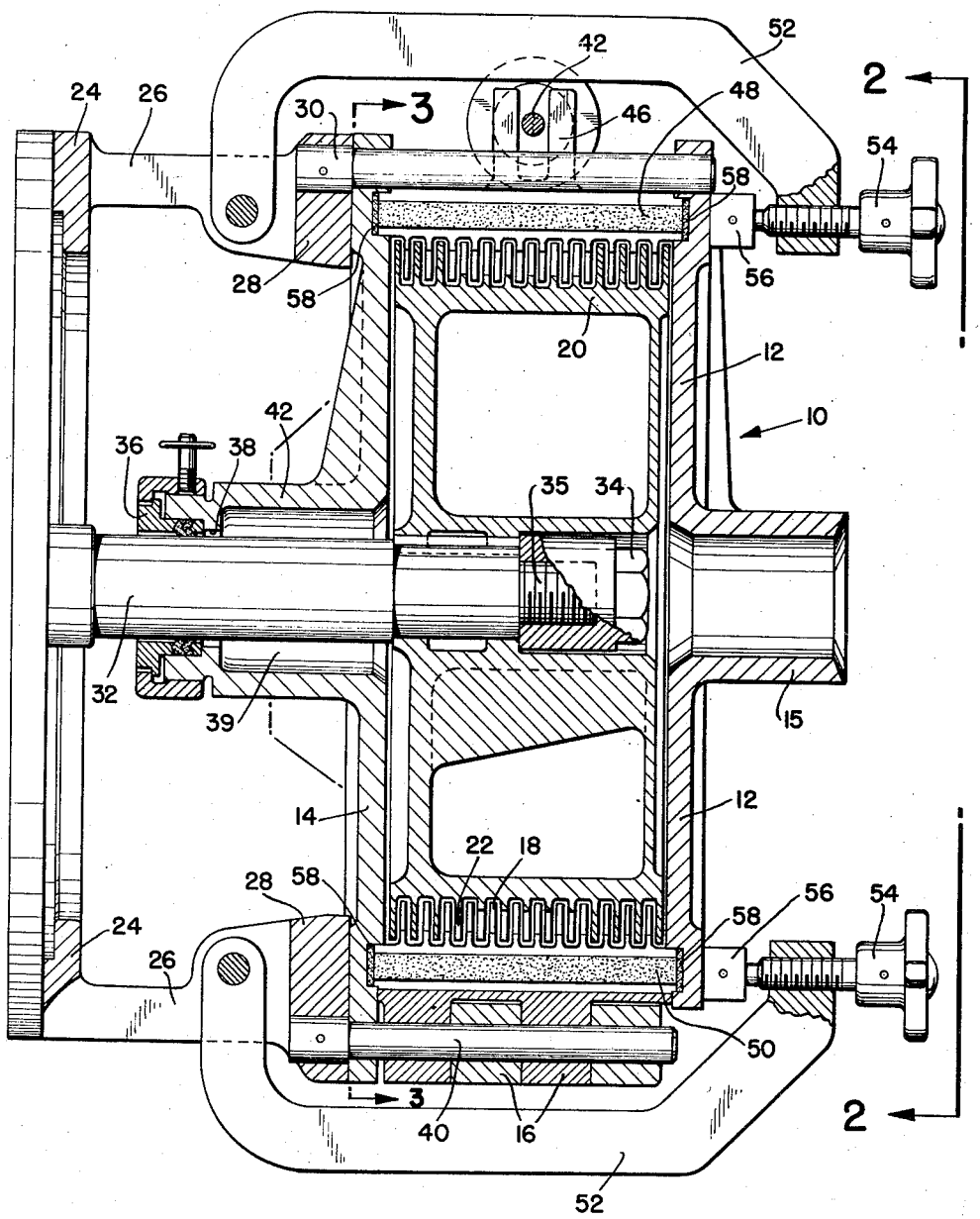
Figure 2:
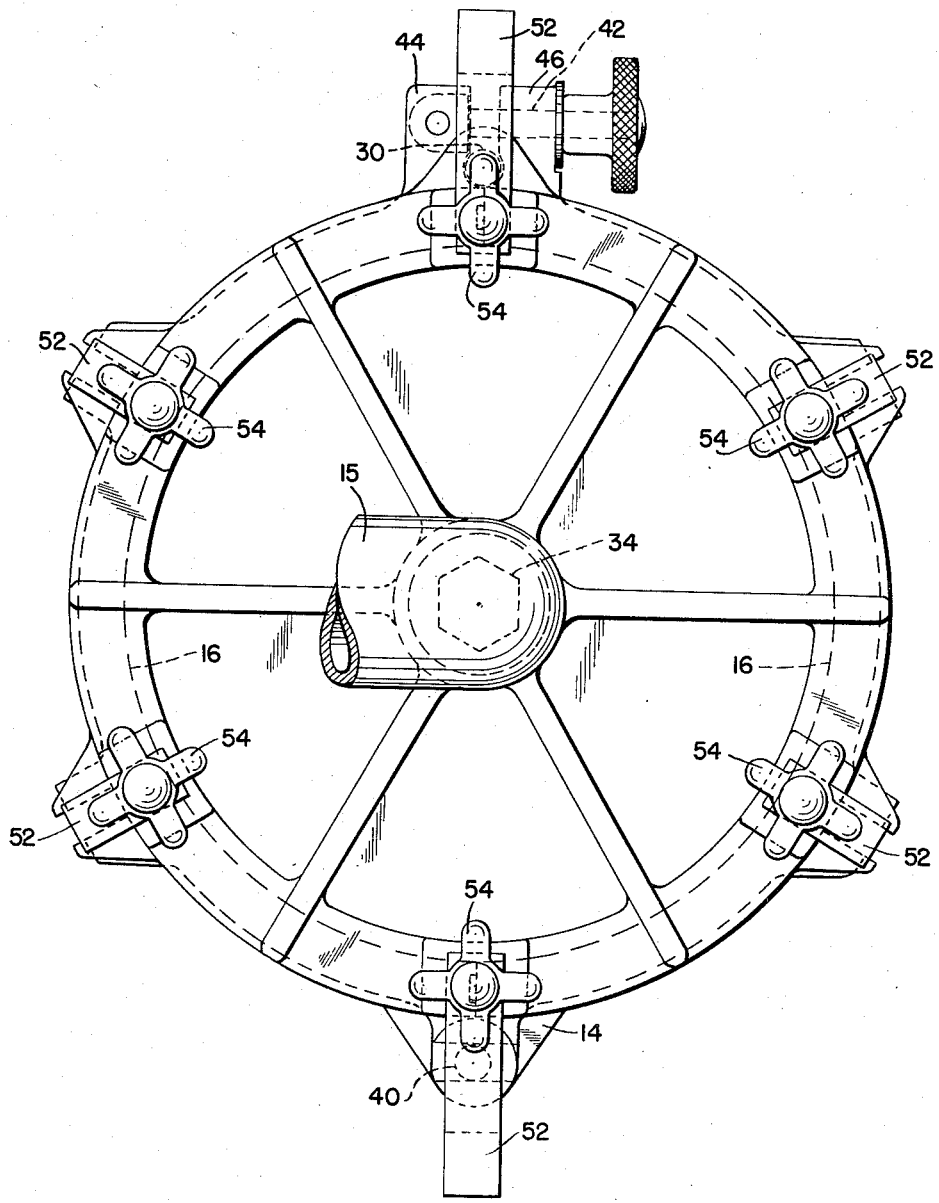
Figure 3:
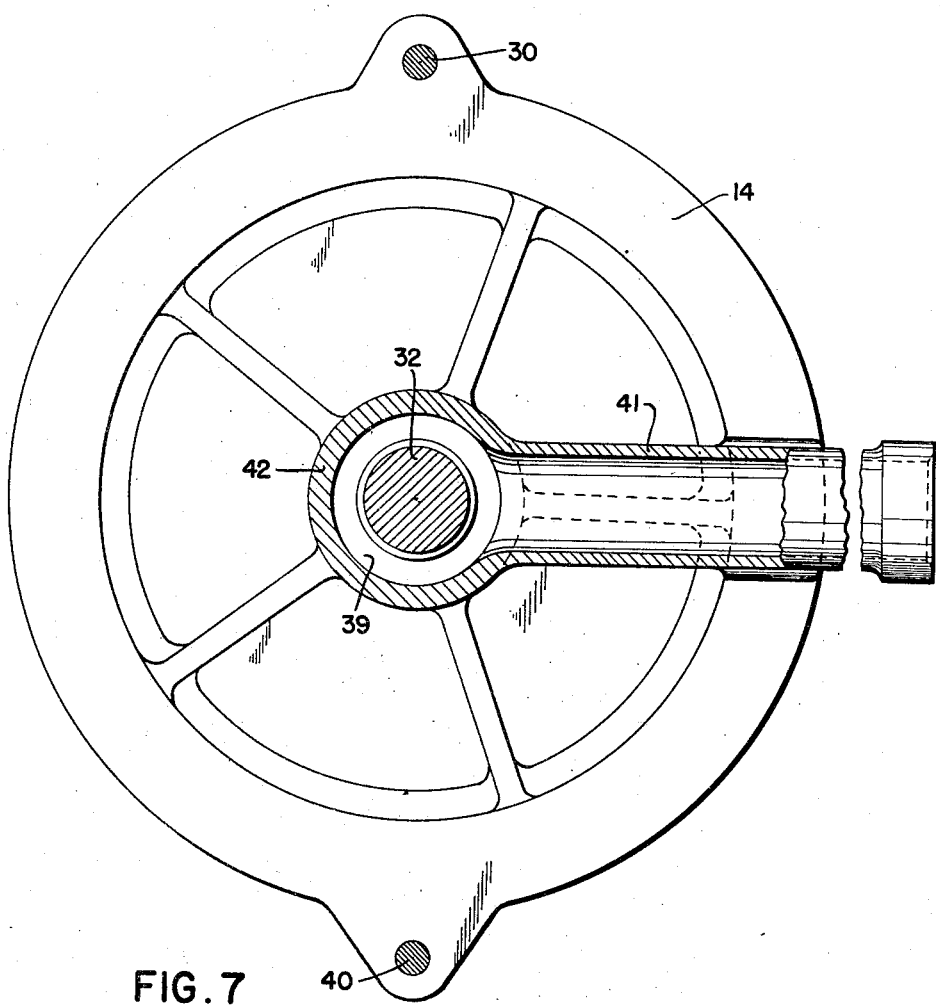
Figure 7:
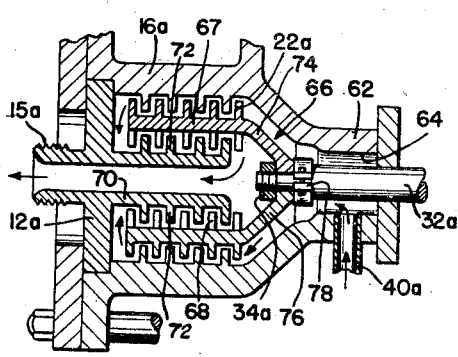
Figure 4:
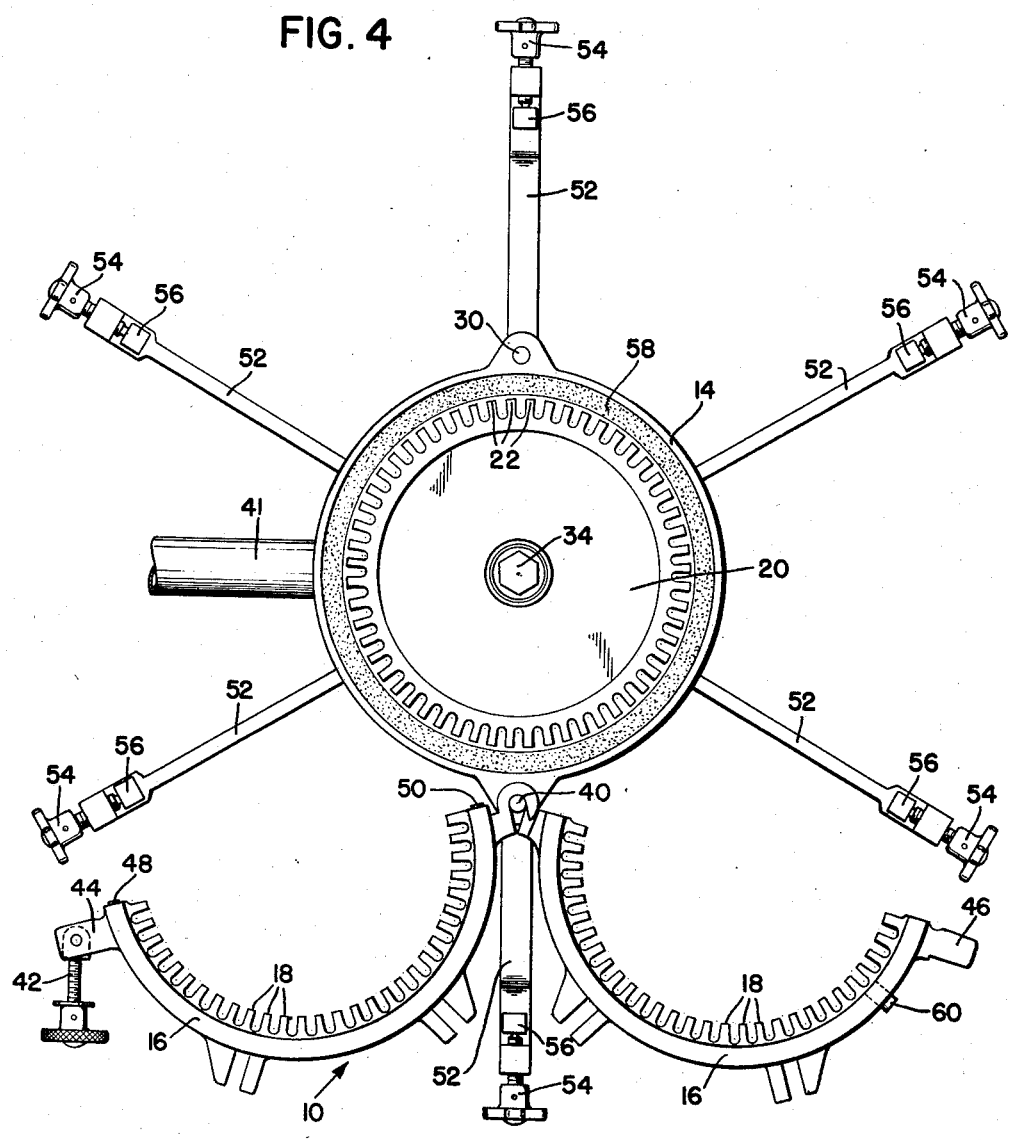
Figure 5:
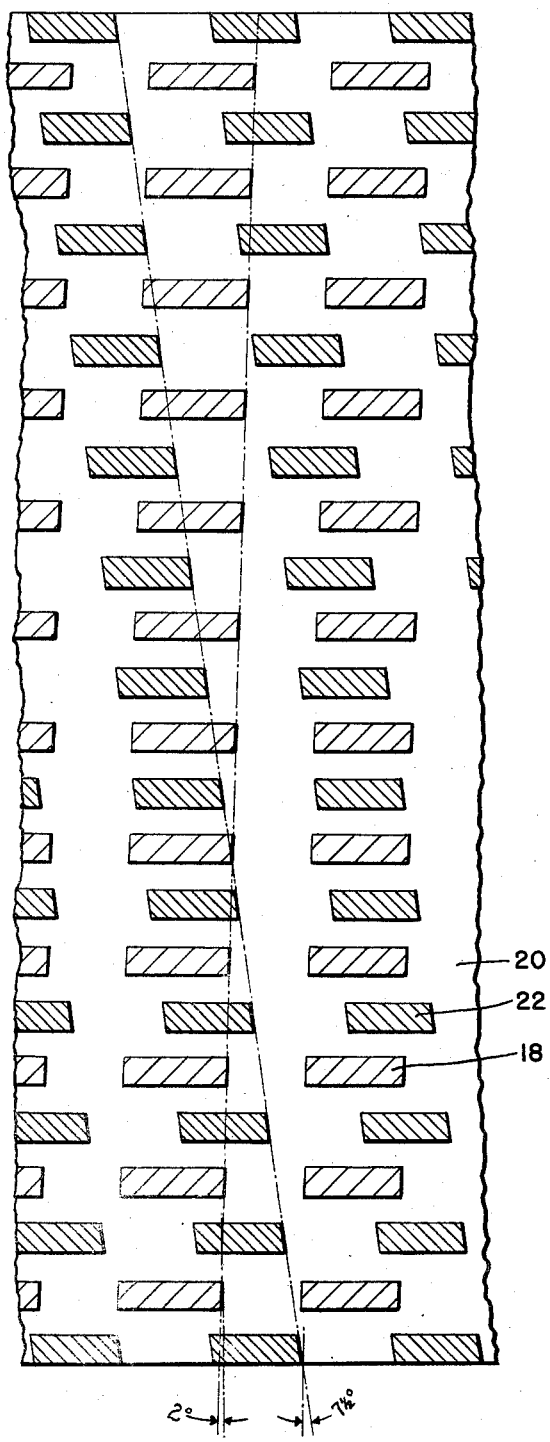
Figure 6:
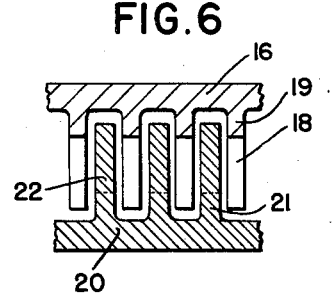

The novel features which are believed to be characteristic of the invention are set forth with particularity in the appended claims. The invention itself, however, both as to its organization and method of operation may be understood by reference to the apparatus embodying the invention and shown in the accompanying drawings, in which:

Fig. 1 is a sectional elevation of the assembled mixer;
Fig. 2 is a front elevation from the line 2—2 of Fig. 1;
Fig. 3 is an elevation partly in section taken on line 3—3 of Fig. 1;
Fig. 4 is a front elevation of the mixer showing the stator in open position;
Fig. 5 is a plan view of a fragment of the rotor, rotor teeth and stator teeth;
Fig. 6 is a fragmentary view of rotor and stator teeth in elevation; and
Fig. 7 is a sectional side elevation of a species modification.

Referring to Fig. 1 of the drawings, the mixer has a stator 10 comprising a front plate 12, a rear plate 14 and a toothed peripheral stator ring 16. Front and rear plates 12 and 14 engage the sides of split peripheral ring 16 having the teeth 18 formed on its internal periphery. The rotor 20 has formed on its external periphery teeth 22 positioned to interengage teeth 18 of stator ring 16. The back plate is mounted on the main supporting frame 24 of the machine by the spider lugs 26 integral with a ring 28 secured by suitable means to back plate 14. A driven shaft 32 protrudes from the main frame 24 of the machine and supports the rotor 20 secured thereto by the nut 34. Packing gland 36 forms a liquid and air tight seal around shaft 32 passing through bore 38 formed in the hub 42 of rear plate 14. Shaft 32 has a reduced threading portion 35 to receive nut 34 to secure rotor 20 to shaft 32.

Referring to Figs. 1 and 3, it may be seen that input pipe 41 is integral with hub 42 of the plate 14. The bore of pipe 41 communicates with the enlarged chamber 39 also formed in hub 42.

In Figs. 1 and 2, the front plate is shown with axially located integral outlet pipe 15. The flow of material is therefore from input pipe 41, through chamber 39, around stator 20 and out outlet pipe 15.

Referring to Fig. 4, the two halves of split stator ring 16 are hinged together at the bottom on the pin 40 secured in ring 28. The two halves of stator ring 16 are held in closed position by clamp screw 42 (Figs. 2 and 4) pivotally mounted in a U-shaped lug 44 engaging a U-shaped lug 46. Gaskets 48 and 50 seal the two halves at their bottom and top respectively.

The front plate clamps 52 are pivotally secured to spider lugs 26. Each clamp 52 carries a threaded screw 54 carrying a swiveled clamping block 56. When screw 54 is tightened, it bears upon and urges front plate 12 tightly against ring 16 and ring 16 against rear plate 14. Each plate 12 and 14 carries a circular gasket 58 to form a tight seal between ring 16 and plates 12 and 14 respectively. Gaskets 48, 50 and 58 are all preferably oil-resistant, non-toxic, odorless and tasteless. Neoprene or Hycar base material has proved very satisfactory.

Referring now to Fig. 5, there is shown a random relative position between the teeth 22 of rotor 20 and teeth 18 of stator 10 (ring 16). In this figure, for example, the flow of material may be from the top to the bottom and the direction of the rotor's teeth 22, from left to right. Several advantages become apparent: (a) the angle of the leading edge of rotor 22 tends to have a pumping action against the flow of liquid from top to bottom, (b) at any random static position of the rotor and stator there is no straight line passage across rotor and stator, and (c) upon removal of stator ring 16 from rotor 20 there is straight line passage between the teeth both circumferentially and substantially transversely for ready cleaning and brushing of rotor and stator separately.

The two degree angle on the stator teeth provides sufficient set to prevent straight line motion across the rotor and stator in operation. The higher angulation of 7½ degrees as shown on the rotor teeth is provided for the same reason plus the additional reverse pumping action. The flow of material, accordingly, must be either in the maze about the teeth going from the top to the bottom of Fig. 5 or in the smaller region under and over the teeth as is apparent in Fig. 6.

Also with reference to Fig. 6 it will be noted that teeth 22 extend outwardly to a radius beyond the lands or base of the transverse cut forming the teeth 18. Thus the circumferential rings 19 block any straight line flow past the end of the teeth. In like manner, the teeth 18 extend inwardly beyond the lands or base of the cut forming the teeth 22 so that the circumferential rings 21 block any straight line flow past the end of these teeth.

The volumetric area bounded by the outside periphery of the rotor and the inside periphery of the stator is small, of course, while the velocity of the peripheral positioned rotor teeth is at a maximum. The consequent whipping, frothing or mixing action are tremendously high.

Small amounts of activating materials, as for example gelling agents for rubber or vinegar for mayonnaise, may be incorporated by piercing stator ring 16 and inserting a rubber plug 60 (Fig. 4) to receive an injection needle, as is well known in the art. Similar provisions may be made in front and rear plates 12 and 14 where a particular process might require it.

Referring now to Fig. 7, there is shown a modification of the invention having internal rotor teeth which are also located near the periphery of the rotor or in the area of high velocity. Structures similar or analogous to the structures shown in Figs. 1–6 are given the same reference number plus the letter a. Split ring stator 16a has a rearward extension 62. Bore 64 of extension 62 receives driving shaft 32a to which is attached rotor 66. Rotor 66 differs from rotor 20 in that in addition to the outwardly extending peripheral teeth 22a it carries on the internal periphery of its rim 67 the inwardly extending teeth 68. The front plate 12a has an inwardly longitudinally extending elongated hub 70 having a discharge bore communicating with the pipe 15a integral with plate 12a. Hub 70 has outwardly extending teeth 72 interpositioned between the inwardly extending teeth 68 of rotor 66.

Rotor 66 is formed in two halves, a top half 74 and a bottom half 76, which are held together by clamp collar 78 about driving shaft 32a to which rotor 66 is secured by nut 34a. Inlet pipe 40a is formed integral with stator ring extension 62. The bore of inlet pipe 40a communicates with bore 64 around the driven shaft 32.

With this modified construction it may be seen that the internal teeth 68 have almost as high a velocity as the teeth 22a since they are located at almost as great a radius from the axis of rotation.

We claim:

1. A mixing and aerating device comprising, a rotor and a stator housing, said rotor being mounted on the free end of a shaft, a plurality of radially extending peripheral teeth being formed on the periphery of said rotor, said stator being formed of a circumferential ring having at least one internal radially extending ring positioned to interfinger between the teeth of said rotor, the front and rear sides of said circumferential ring being closed by front and rear plates respectively engaging the sides of said ring in a seal tight relationship, said rear plate further characterized by a central opening to receive said shaft, said opening being larger than said shaft to provide an inlet passageway about said shaft, and said front plate having an opening therein to allow egress of material from said mixer.

2. A mixing and aerating device comprising, a rotor and a stator housing, said rotor being mounted on a shaft, a plurality of radially extending peripheral teeth being formed on the periphery of said rotor, said teeth being formed in a plurality of regular continuous circumferential rows, said stator being formed of a circumferential ring having at least one internal radially extending ring being positioned between said circumferential rows of teeth on said rotor, the front and rear sides of said circumferential ring being closed by front and rear plates respectively engaging the sides of said ring in seal tight relationship, said rear plate further characterized by a central opening to receive said shaft and having an inlet to charge material into said mixer, and said front plate having an opening therein to allow egress of material from said mixer.

3. A closed continuous mixing machine comprising, an internal rotor and an outside closed stator housing, said rotor being mounted on a rotating shaft and having a plurality of outwardly extending radial teeth on its periphery, said teeth being arranged in a plurality of continuous regular circumferential rows, said stator comprising a peripheral circular casing having a plurality of inwardly extending internal peripheral teeth arranged in circumferential rows interpositioned between said rows of teeth on said rotor, said circular casing being divided into at least two sections, said sections being pivotally secured at their one end, latch means at their other end to secure said section into operative position, and means to close the ends of said circular casing.

4. A closed continuous mixing machine comprising, an internal rotor and an outside closed stator housing, said rotor being mounted on a rotating shaft and having a plurality of outwardly extending radial teeth on its periphery, said teeth being arranged in a plurality of regular circumferential continuous rows, said stator comprising a peripheral circular casing having a plurality of inwardly extending internal peripheral teeth arranged in circumferential rows interpositioned between said rows of teeth on said rotor, said circular casing being divided into at least two sections, said sections being detachably secured to each other and front and rear plates engaging front and rear sides of said circular casing in a liquid and air tight seal to form a closed stator about said rotor, said rear plate having an opening to receive said rotating shaft and said front plate having a discharge opening.

5. An apparatus substantially as set forth in claim 3 further characterized in that at least two rows of circumferential teeth are rotationally staggered with respect to each other to prevent a straight line path between said teeth parallel to the axis of rotation.

6. An apparatus substantially as set forth in claim 4 further characterized in that at least two rows of circumferential teeth are rotationally staggered with respect to each other to prevent a straight line path between said teeth parallel to the axis of rotation.

7. A closed mixer of the type suitable for continuous pressurized mixing comprising, an internal rotating rotor and an external stator housing surrounding said rotor, inlet means and outlet means on opposite sides of said rotor to permit material to be passed through said mixer in one direction, said rotor having a plurality of outwardly extending radial teeth formed on its periphery, said teeth being arranged in regular circumferential rows, the leading edges of said teeth during rotation being cut on an angle facing the inlet side of said rotor to provide a reverse pumping action when said rotor is rotated and a flow of material to be mixed flows about said rotor within said stator from the rear to the front.

8. A continuous closed mixer comprising, an internal rotating rotor and an external stator housing, said rotor being mounted on a co-axial driving shaft, a plurality of outwardly extending radial teeth on the periphery of said rotor, said teeth being arranged in regular circumferential rows but being staggered rotationally row for row to provide a straight row of teeth angularly disposed to any plane passing through the axis of said rotor and co-planar therewith, said teeth being further characterized by having the leading edge during rotation angled to face toward the infeed side of material passing about said rotor to provide a reverse pumping action on said material during rotation of said rotor, said stator being formed as a circular housing adapted to be positioned about said rotor, said circular housing having internal projecting peripheral teeth positioned in regular circumferential rows between said rotor teeth, said casing being divided into at least two sections, said sections being detachably secured to each other for removal outwardly from said rotor, front and rear plates respectively secured to the front and rear of said circular casing to cooperate with said casing to house said rotor in a closed container, said rear plate having an inlet opening and said front plate having an outlet opening.

9. A continuous mixing machine having a stator and a rotor, said rotor being mounted on the free end of a driven shaft and formed as a ring having outwardly extending peripheral teeth on the external circumference of said ring, said teeth being arranged in regular circumferential rows, internal inwardly extending teeth on the internal periphery of said ring, said teeth being likewise arranged in regular circumferential rows, said stator comprising an outside ring surrounding said rotor ring, said outside ring having internal inwardly extending peripheral teeth interpositioned between the outwardly extending teeth of said rotor, front and rear plates secured to said ring in seal tight relationship, one of said end plates having a bore therein to receive said driven shaft of said rotor, one of said end plates having an inwardly extending circular member having outwardly extending radial peripheral teeth thereon, said teeth being arranged in regular circumferential rows and interpositioned between said inwardly extending teeth of said rotor, said end plates and said circular member on one of said end plates having formed therein passageways communicating with the exterior for the passage of material through said mixing machine.

10. A continuous mixing machine having a stator and a rotor, said rotor being mounted on a driven shaft and comprising a circular rim co-axial with said shaft, radially extending peripheral teeth extending outwardly from the external peripheral surface of said circular rim and extending inwardly from the internal peripheral surface of said rim, said rotor being formed in at least two detachably secured sections to permit its removal outwardly from the axis of said driven shaft, said stator comprising an outside ring surrounding said rotor rim and having front and rear end plates to form with said stator ring a housing enclosing said rotor rim, inwardly extending radial teeth on said stator ring interpositioned between said outwardly extending radial teeth of said rotor rim, said front plate having an integral hollow hub coaxial with said shaft extending into said rotor rim, outwardly extending radial teeth mounted on the peripheral surface of said hub and interposed between said inwardly extending radial teeth of said rotor rim, a passageway formed in said front plate communicating the exterior with said hollow hub, a further passageway formed in said housing formed by said outside stator ring and said end plates whereby materials to be mixed may pass through said housing by virtue of said passageway and said communicating opening in said front plate.

11. A device substantially as set forth in claim 10 further characterized by having said teeth arranged in circumferential rows but staggered from an adjacent row to prevent straight through passageway between said teeth parallel to the axis of rotation of said rotor.

12. A device as set forth in claim 2 further characterized by having inwardly extending radial teeth formed on said internal radially extending ring, said teeth extending inwardly radially farther than the inwardmost tip edge of said ring.

13. A mixing and aerating device comprising a rotor and a stator housing, said rotor being mounted for rotation in said stator, a plurality of outwardly extending peripheral teeth being formed on the periphery of said rotor, an inwardly extending circumferential ring on said stator housing, said ring extending between and beyond the tip of the outwardly extending teeth on said rotor, and teeth further formed on said inwardly extending ring to further overlap said outwardly extending teeth so that material moving in a generally axial direction between said stator and rotor must move through a tortuous path over said ring and between or over said outwardly extending teeth.

14. A mixing and aerating device comprising a rotor and a stator housing, said rotor being mounted for rotation in said stator, a plurality of circumferential inwardly extending continuous members mounted on said stator, a plurality of circumferential outwardly extending continuous members mounted on said rotor, and positioned to alternate with said inwardly extending members, said outwardly extending and said inwardly extending members having dentate edges, the dentate edges of the outwardly extending members extending outwardly beyond the lands of the inwardly extending members and the inwardly extending dentate edges extending inwardly beyond the lands of the outwardly extending members.

15. A mixing and aerating device comprising a pair of members, one of said members being the outer housing and the other of said members being an inner hub, means to move at least one of said members rotatively with respect to the other of said members, said outer housing having a plurality of inwardly extending rings having inwardly extending dentate edges, said hub member having a plurality of outwardly extending rings having dentate edges and positioned to alternate with said inwardly extending dentate rings, the outwardly extending dentate edge of said inner member extending beyond the radius of the lands of said inwardly extending dentate ring and said inwardly extending dentate edges extending inwardly beyond the radius of the lands of said outwardly extending dentate ring.

References Cited in the file of this patent

UNITED STATES PATENTS

| 1,624,567 | Teague | Apr. 12, 1927 |
| 2,092,992 | Thalman | Sept. 14, 1937 |
| 2,627,394 | Spencer | Feb. 3, 1953 |
| 2,685,436 | Hasselquist | Aug. 3, 1954 |

FOREIGN PATENTS

| 276,356 | Great Britain | July 5, 1928 |